(12) United States Patent
Roesgen et al.

(10) Patent No.: US 6,513,560 B2
(45) Date of Patent: Feb. 4, 2003

(54) TIRE WITH INLAY RING MOUNTED IN SIDEWALL

(75) Inventors: Alain Emile Francois Roesgen, Luxembourg (LU); Filomeno Gennaro Corvasce, Mertzig (LU); Laurent Colantonio, Bastogne (BE); Frank Philpott, Waldbredimus (LU)

(73) Assignee: The Goodyear Tire and Rubber Company, Akron, OH (US)

( * ) Notice: Subject to any disclaimer, the term of this patent is extended or adjusted under 35 U.S.C. 154(b) by 0 days.

(21) Appl. No.: 09/727,745

(22) Filed: Dec. 1, 2000

(65) Prior Publication Data

US 2002/0066513 A1 Jun. 6, 2002

(51) Int. Cl.$^7$ ................................................ B60C 13/02
(52) U.S. Cl. ......................... 152/523; 152/513; 152/524
(58) Field of Search ................................. 152/523, 524, 152/513, 209.6, 169, 173, 175, 176, 185, 187, 188; 301/37.22

(56) References Cited

U.S. PATENT DOCUMENTS

| | | | |
|---|---|---|---|
| 1,897,974 A | * 2/1933 | Wolf | 152/188 |
| 2,254,329 A | * 9/1941 | Stephens | 152/176 |
| 2,440,804 A | * 5/1948 | Lyon | 301/37.22 |
| 2,977,151 A | * 3/1961 | Ford, Jr. | 301/37.22 |
| 3,128,815 A | * 4/1964 | Nonnamaker | 152/524 |
| 3,164,192 A | * 1/1965 | Kasio et al. | 152/523 |
| 3,786,848 A | 1/1974 | Brown et al. | |
| 4,168,732 A | 9/1979 | Monzini | |
| 4,230,169 A | 10/1980 | Boileau et al. | |
| 4,235,271 A | 11/1980 | Olsen et al. | |
| 4,413,663 A | 11/1983 | Sullenger | |
| 4,699,193 A | 10/1987 | Bryant et al. | |
| 4,809,757 A | 3/1989 | Shurman | |
| 5,300,164 A | 4/1994 | DeTrano et al. | |
| 5,474,645 A | 12/1995 | Bohm et al. | |
| 5,518,055 A | 5/1996 | Teeple et al. | |
| 5,573,625 A | 11/1996 | Lovell et al. | |
| 5,885,386 A | 3/1999 | Makinson et al. | |

FOREIGN PATENT DOCUMENTS

JP        5-139123 A   *  6/1993   ................. 152/524

* cited by examiner

*Primary Examiner*—Geoffrey L. Knable
(74) *Attorney, Agent, or Firm*—Howard M. Cohn

(57) ABSTRACT

The invention relates to a pneumatic tire with a toroidal shaped tire carcass having sidewalls and a tread. The tire carcass terminates at opposite bead regions for mounting on a tire rim. The tire has at least one of the sidewalls having a circumferentially extending continuous groove, and a non-rubber inlay ring secured within the continuous groove of the sidewall(s) to form a rim flange protector.

14 Claims, 4 Drawing Sheets

TIRE WITH INLAY RING MOUNTED IN SIDEWALL

TECHNICAL FIELD

The present invention generally relates to the construction of pneumatic tires and more particularly to an improved tire construction having a ring flange protector mounted in the sidewall area.

BACKGROUND OF THE INVENTION

As discussed in U.S. Pat. No. 4,413,663 ('663), for many years, pneumatic tires have incorporated white color or adornment to the characteristic black coloration of the tires. More recently whitewalls have appeared in variations such as a plurality of stripes, stripes in colors other than white, stripes in varying widths, and combinations of these variables. Also whitewall decoration now includes raised white or colored letters which identify the manufacturer, a particular tire configuration, or other indicia.

The previously mentioned color decoration for pneumatic tires has generally been effected in one of two ways. The most common technique is to incorporate whitewall materials by extruding the desired colored compound simultaneously with the sidewall stock of the tire during the initial fabrication of components or building stage. In the other technique, the whitewall element is added subsequent to the final shaping and curing of the tire.

The first technique generally embeds the desired colored compound into the characteristic black sidewall stock of the tire during the extruding or the fabrication of the sidewall and prior to the first stages of tire fabrication or building. The colored compound is normally covered with a thin layer or laminate of black sidewall stock commonly referred to as a cover strip. The tire is subsequently completed in conventional fashion as in the manufacture of a standard black wall tire through the shaping and vulcanization steps. Subsequent to vulcanization, grinding or butting equipment is employed to remove portions of the cover strip and expose the extent of colored compound necessary to achieve the predetermined desired decorative effect. Their commercial acceptance has been limited because of the additional cost associated with the additional processing steps and the increased number of imperfect tires caused by the additional processing.

The other technique, where the whitewall element is applied subsequent to the final shaping and curing of the tire, is generally accomplished by the attachment of a colored element to the sidewall of the tire by either bonding techniques or mechanical attachment to flaps or overhanging shoulders formed in the sidewall of a tire.

As discussed in the '663 patent whitewalls produced by this technique can also constitute a combined sidewall decorating and reinforcing structural element. An inlay ring formed as an elastomeric body containing reinforcing cords is integrally united by a curing process subsequent to the tire building operation. The cord elements provides the reinforcement and the elastomeric can be of any desired color. Never the less, the elastomeric portion of the inlay ring is subject to wear when abraded against a curb and the like. Also, the cords are deficient because besides being expensive (cords plus manufacturing), they can induce separations during tire deflection when the inlay ring will be forced to adapt to a smaller diameter than in its natural, undetected state. Therefore the cords will have to go into compression which they are not designed to handle. Also from an esthetic point of view, this spirally wound ring is not uniform about the tire circumference.

SUMMARY OF THE INVENTION

According to the present invention, a pneumatic tire has a rubber, toroidal shaped carcass with sidewalls and a rubber tread. The rubber carcass is terminated at opposite bead regions for mounting on a tire rim. The tire has at least one of the sidewall with a circumferentially extending continuous groove and a non-rubber inlay ring secured within the continuous groove of the sidewalls to form a rim flange protector.

According to the invention, the non-rubber inlay ring is constructed of a material from the group including plastic, metal, alloys and thermoplastic.

According to the invention, the circumferentially extending continuous groove is generally trapezoidal shaped in cross-section and the non-rubber inlay ring is configured for substantially mating engagement.

Further according to the invention, the circumferentially extending, continuous groove can have different cross-sectional shapes and the non-rubber inlay ring is configured for substantially mating engagement.

In one embodiment, the circumferentially extending continuous groove is of greater radial width at the bottom of the slot than at opening thereof.

Further according an embodiment of the invention, the non-rubber inlay ring is secured within the sidewalls to form a rim flange protector during vulcanization of the tire.

Also according to another embodiment of the invention, the non-rubber inlay ring is secured within the continuous groove of the sidewalls to form a rim flange protector subsequent to vulcanization of the tire. The non-rubber inlay ring can be secured within the continuous groove of the sidewalls with an adhesive.

BRIEF DESCRIPTION OF THE DRAWINGS

Reference will be made in detail to preferred embodiments of the invention, examples of which are illustrated in the accompanying drawings. The drawings are intended to be illustrative, not limiting. Certain elements in selected ones of the drawings may be illustrated not-to-scale, for illustrative clarity.

Often, similar elements throughout the drawings may be referred to by similar reference numerals. For example, an element 199 in a figure (or embodiment) may be similar in many respects to an element 299 in another figure (or embodiment). Such a relationship, if any, between similar elements in different figures or embodiments will become apparent throughout the specification, including, if applicable, in the claims and abstract.

In some cases, similar elements may be referred to with similar numbers in a single drawing. For example, a plurality of elements 199 may be referred to as 199a, 199h, 199c, etc. The cross-sectional views presented herein may be in the form of "slices", or "near-sighted" cross-sectional views, omitting certain background lines that would otherwise be visible in a true cross-sectional view, for illustrative clarity.

Figure 1:
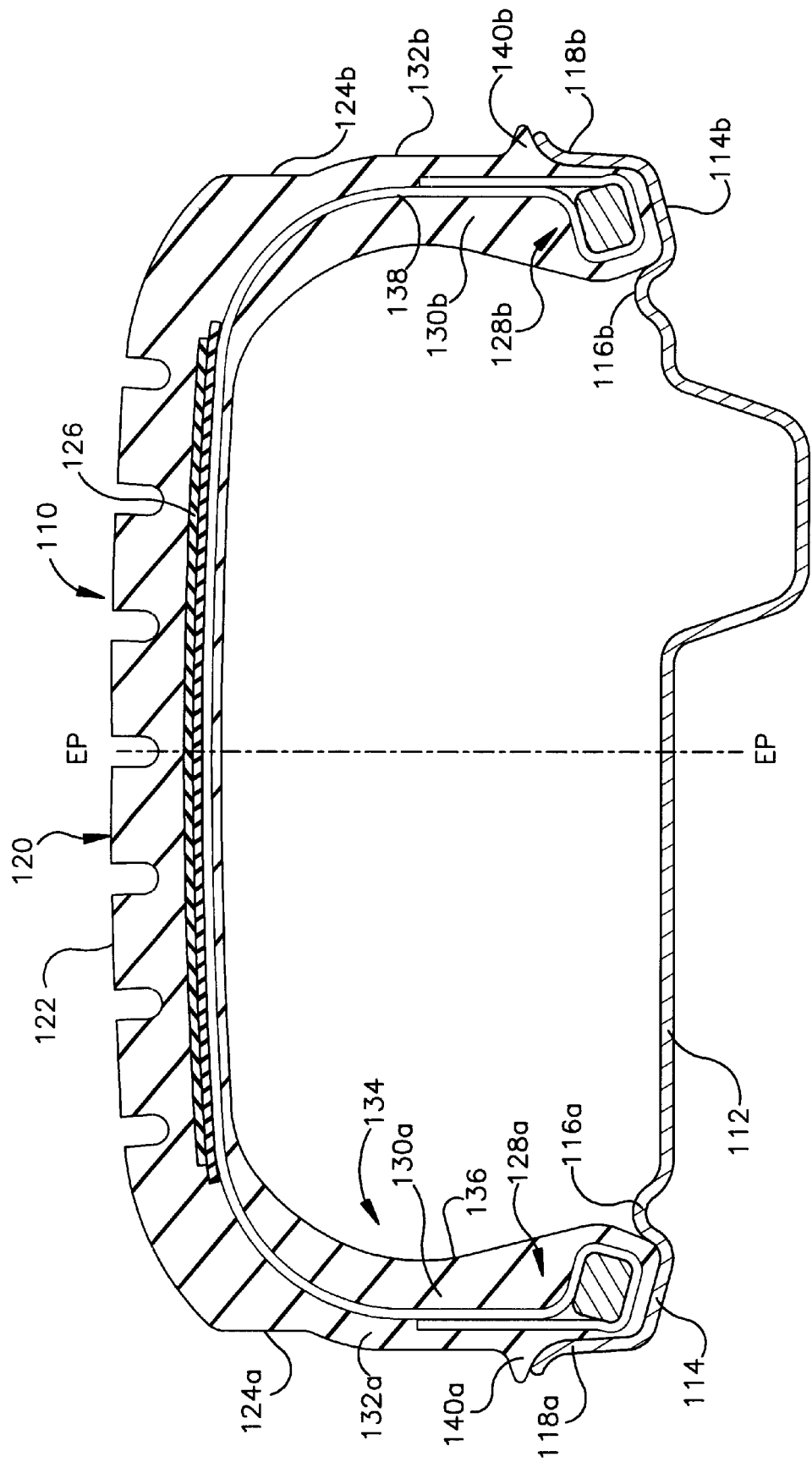
Figure 2:
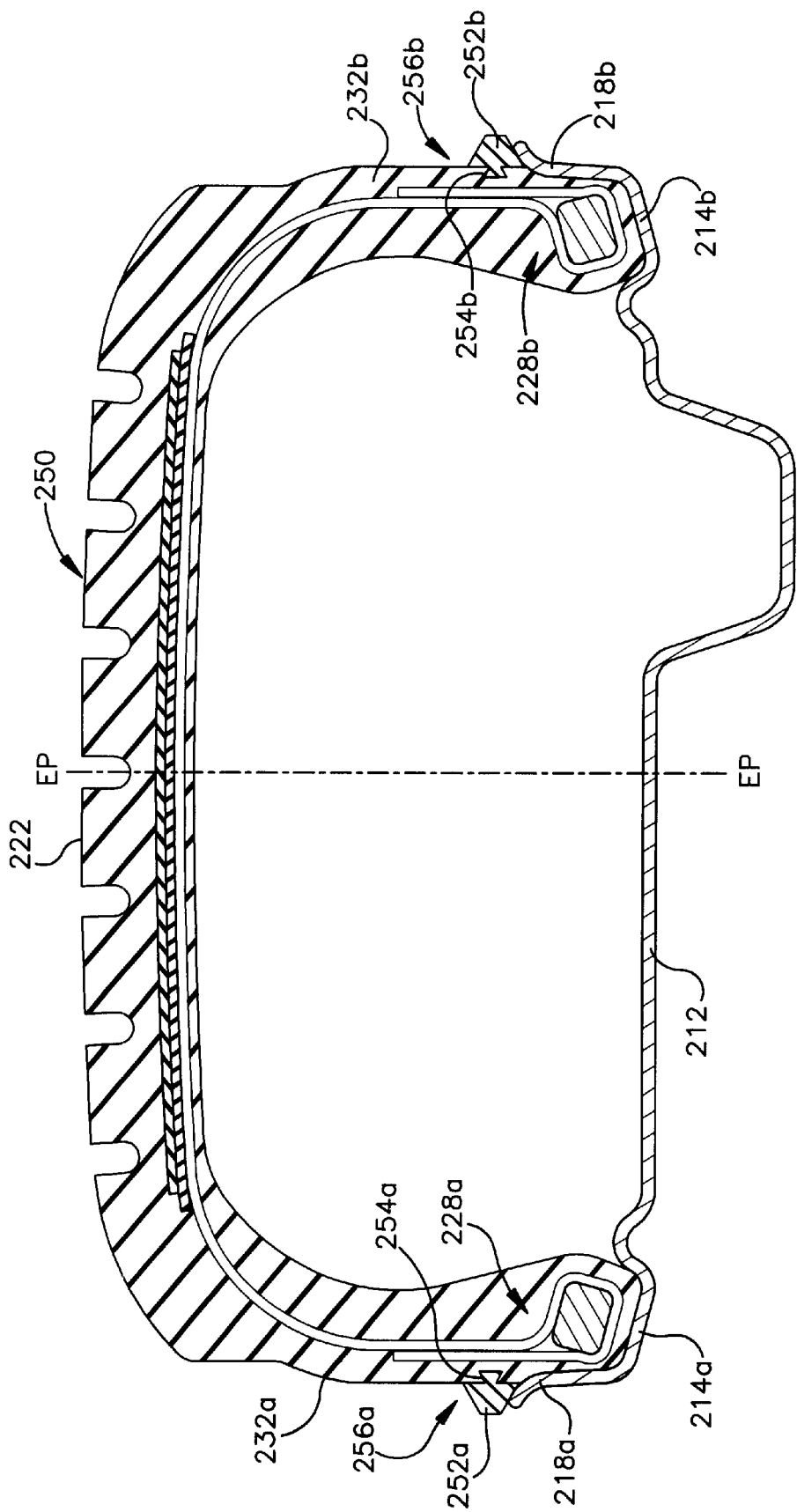
Figure 2A:
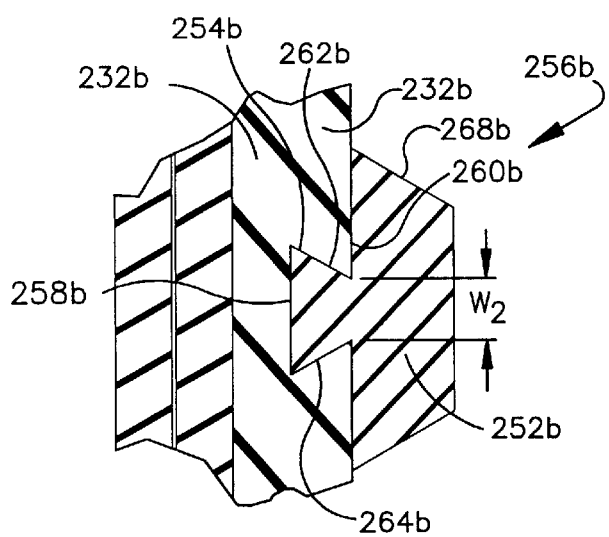
Figure 2B:
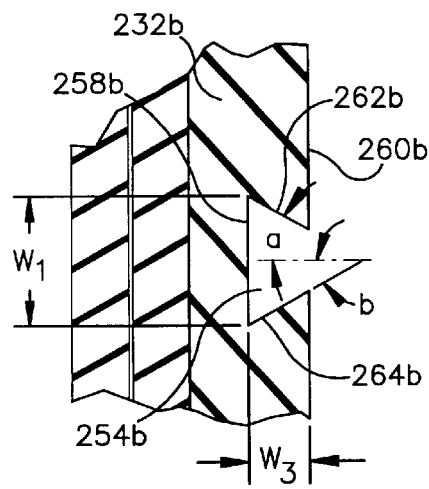
Figure 2C:
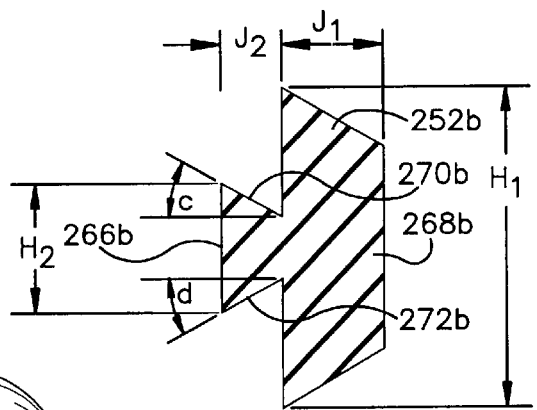
Figure 3:
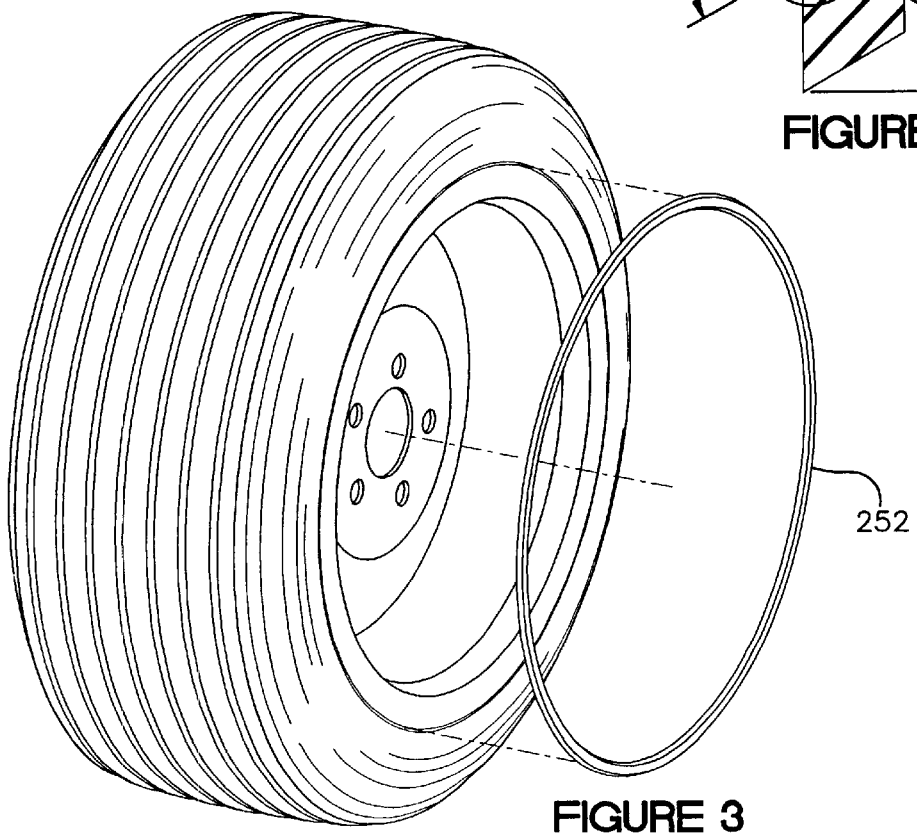
Figure 4:
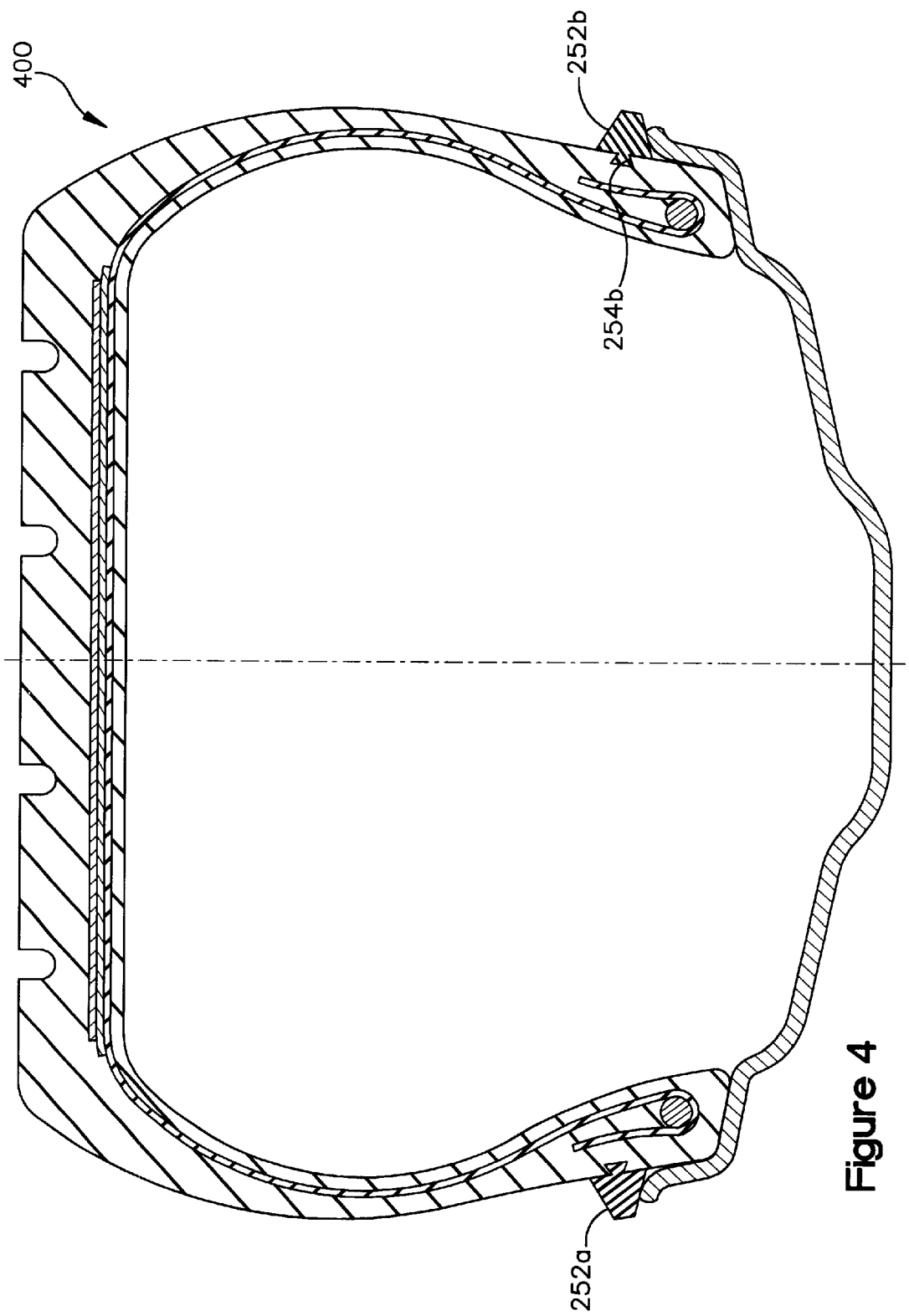

The structure, operation, and advantages of the present preferred embodiment of the invention will become further apparent upon consideration of the following description taken in conjunction with the accompanying drawings, wherein:

FIG. 1 is a cross-sectional view of a tire with a prior art ring flange protector mounted on a rim;

FIG. 2 is a cross-sectional view of a tire with a ring flange protector according to the present invention mounted on a rim;

FIG. 2A is an enlarged view of the inlay rind of the present invention mounted in a continuous groove disposed in a sidewall of the tire shown in FIG. 2; and FIG. 2B is an enlarged view of the continuous groove disposed in a sidewall of the tire shown in FIG. 2A:

FIG. 2C is an enlarged cross sectional view of the inlay ring of the present invention;

FIG. 3 is a perspective exploded view of the inlay ring of the present invention and a tire into which it is mounted; and FIG. 4 is a cross-sectional view of a conventional tire with a ring flange protector according to the present invention mounted on a rim.

DEFINITIONS

"Apex" means an elastomeric filler located radially above the bead core and between the plies and the turnup ply.

"Axial" and "Axially" means the lines or directions that are parallel to the axis of rotation of the tire.

"Axially Inward" means in an axial direction toward the equatorial plane.

"Axially Outward" means in an axial direction away from the equatorial plane.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcement Belts" means at least two annular layers or plies of parallel cords, woven or unwoven, underlying the tread, unanchored to the bead, and having both left and right cord angles in the range from 17E to 27E relative to the equatorial plane of the tire.

"Breakers" or "tire breakers" means the same as belt or belt structure or reinforcement belts.

"Bead" or "Bead Core" generally means that part of the tire comprising an annular tensile member of radially inner beads that are associated with holding the tire to the rim.

"Carcass" means the tire structure apart from the belt structure, tread, undertread over the plies, but including the beads.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands of which the plies and other cord-reinforced components of the tire are comprised.

"Green carcass" means the uncured tire carcass prior to the installation of the belt structure and tread.

"Insert" means the cross-sectionally crescent- or wedge-shaped reinforcement typically used to reinforce the sidewalls of runflat-type tires.

"Lateral" means a direction parallel to the axial direction.

"Ply" means a cord-reinforced layer of rubber coated radially deployed or otherwise parallel cords.

"Radial" and "radially" mean directions radially toward or away from the axis of rotation of the tire.

"Radial ply structure" means the one or more carcass plies of which at least one ply has reinforcing cords oriented at an angle of between 65° and 90° with respect to the equatorial plane of the tire.

"Radial ply tire" means a belted or circumferentially-restricted pneumatic tire in which at least one ply has cords which extend from bead to bead are laid at cord angles between 65° and 90° with respect to the equatorial plane of the tire.

"Shoulder" means the upper portion of sidewall just below the tread edge.

"Sidewall" means that portion of a tire between the tread and the bead.

"Tangential" and "tangentially" refer to segments of circular curves that intersect at a point through which can be drawn a single line that is mutually tangential to both circular segments.

"Tread" means the ground contacting portion of a tire.

"Tire crown" means the tread, tread shoulders and adjacent portions of the sidewalls.

DETAILED DESCRIPTION OF THE PREFERRED EMBODIMENT

Referring to FIG. 1, there is shown the partial cross section of a tire 110 mounted on a conventionally-shaped wheel rim 112 including bead seats 114a, 114b, flanges 116a, 116b, and axially extending portions 118a, 118b. The tire 110 has a tread area 120 comprising a ground contacting tread 122 having two tread shoulders 124a, 124b and a circumferential belt structure 126 located radially inward of the tread area 120. The tire 110 has two bead areas 128a, 128b, and an interior reinforcement 130a, 130b radially outward of the bead areas. Some optional elements of the bead area 128a, 128b are not shown, but may include such common elements as chafers, chippers, and flippers. Elastomeric sidewalls 132a, 132b extend radially outward from the bead areas 128a, 128b respectively, to the tread shoulders 124a, 124b respectively. The tire 110 has a carcass structure 134 comprising an interior wall 136, and at least one cord reinforced elastomeric ply 138 extending radially outward from each bead area 128a, 128b through the sidewalls 132a, 132b respectively, and traversing the tread area 120 radially inward of the belt structure 126. The bead areas 128a, 128b are shaped for compatibility with the conventionally-shaped bead seat 114a, 114b, the flange 116a, 116b portions of the wheel rim 112, and the axially extending portion 118a, 118b from each bead seat 114a, 114b. A rim flange protector 140a, 140b is provided on one or both of the sidewalls 132a, 132b near the bead areas 128a, 128b of the tire 110. The rim flange protector 140a, 140b comprises a continuous, circumferential elastomeric projection extending axially outward from each bead area/sidewall 128a/132a, 128b/132b thereby extending radially outward of the rim flange 116a, 116b, and axially outward to at least the outermost edge of the axially extending portion 118a, 118b of the conventionally shaped wheel rim 112.

Preferred Embodiment

Referring to FIG. 2, there is illustrated an improved tire 250 which incorporates an inlay ring 252a, 252b secured within a continuous groove 254a, 254b in one or both sidewalls 232a, 232b to form a rim flange protector 256a, 256b. The rim flange protector 256a, 256b comprises the continuous inlay ring 252a, 252b extending axially outward from each bead area/sidewall 228a/232a, 228b/232b thereby extending radially outward of the bead seats 214a, 214b, and axially outward to at least the outermost edge of the axially extending portion 218a, 218b of the conventionally-shaped wheel rim 212.

Referring to FIG. 2A, the rim flange protector 256b, is shown as an enlarged view of the rim flange protector shown in FIG. 2. The rim flange protector 256b can be a mirror, image to the rim flange protector 256a, as shown in FIG. 2, and therefore the discussion relates to both rim flange protectors. The rim flange protector 256b includes a circumferentially extending, continuous groove or slot 254b in sidewall 232b. In the preferred embodiment, the continuous groove 254b has a trapezoidal shape with a greater radial width $W_1$ along the bottom surface 258b of the groove or slot, than at the width $W_2$ across opening 260b thereof. In the slot 254b, shown in FIG. 2A, the sidewalls 262b, 264b are disposed between an angle "a" and an angle "b" of 10° to 90° and preferably 30° to 60° with respect to a center line CL extending perpendicular to the bottom surface 258b, as show in FIG. 2B. If the angle were greater than 90°, then clamping of the ring in the tire would become difficult. If the angle were less than 10°, then the ring would not be secured anchored in the tire groove. While the angles "a" and "b" are preferably equal, it is within the terms of the present invention to select different angles.

While the sidewalls 262b, 264b are shown as having straight surfaces, it is within the terms of the present invention to form the sidewalls 262b, 264b of the groove 254b. Moreover, although the bottom surface 258b is also shown to be flat, it is within the terms of the present invention to form the bottom surface with other shapes such as but not limited to an arcuate shape, including a concave or convex shape.

The previous discussion relating to the shape of the base ring and the corresponding shape of the groove in the tire is of primary importance when the inlay ring is mounted subsequent to the tire being vulcanized. However, in the embodiment when the ring is mounted to the tire prior to the vulcanization of the tire, the shape of the ring base and the groove about the sidewall into which the ring base will be inserted are not critical since the green rubber will flow around the ring and adopt exactly to the shape of the ring base during the step of vulcanization.

The inlay ring 252 is constructed of a non-rubber material from the group including plastic, metal, alloys, thermoplastic and thermoplastic elastomers. Thermoplastics are defined herein as a plastic material that can be shaped by the action of heat and shear forces. The process is purely, physical and does not involve either chemical transformation or crosslinking. The thermoplastics can be semi-crystalline (Polypropylene, polyethylene) and amorphous thermoplastics (Polystyrene, ABS, PC). Thermoplastic elastomers (TPE) are defined as a substance in which elastic polymer chains are integrated in a thermoplastic material. It can be worked in a purely physical process in combination with high shear forces, the action of heat and subsequent cooling. However, chemical crosslinkin, does not necessarily occur through the time and heat combining process of vulcanization.

Preferably, the inlay ring 252a, 252b is of a thermoplastic material, such as an ultra-high molecular weight polyethylene (UHMWPE) with a molecular weight of 3,000,000 to 8,000,000. Besides the usage of pure UHMWPE, a mixture of sufficient amounts of UHMWPE can be dispersed in a non-UHMWPE matrix in order to ensure sufficient cohesive forces with the sidewall tire component.

An advantage of the thermoplastic material is that when the inlay ring 252a, 252b is mounted into the groove 254a, 254b, respectively, prior to the tire being vulcanized in the mold, the thermoplastic material diffuses into the rubber and "causes an entanglement" between the ring and the rubber to secure the ring within the groove. Note that the diffusion of the thermoplastic into the rubber, which is called an entanglement herein, is not the mechanism of cross-linking. In this embodiment where the ring is co-vulcanized with the tire, the inlay ring 252a, 252b is not removable. Another advantage of the mounting of the inlay ring prior to vulcanization is that the flow of rubber, and in particular the material of the rim flange 140a, 140b, is reduced and the rubber flow control problems associated with making heavy rim flange protectors is eliminated. Also, heavier rim flange protectors can now be provided because the need to lower the bead area gauges because of their mechanical resistance in the early curing process, which can lead to crack initiation, is now removed. Instead, the pre-shaped inlay ring is placed in the mold just before the curing press closes and is bound to the tire during vulcanization.

In an alternative embodiment, the UHMWPE is a coatings agent or a thin layer on a ring made of thermoplastic or thermoplastic elastomer.

The inlay ring 252a, 252b can be shaped as shown in FIGS. 2A and 3 with a base section 266a, 266b and a flange portion 268a, 268b. The base portion 266b is preferably of a trapezoidal shape to mate with the groove 254b of the rim flange protector 256b. The sidewalls 270b, 272b of are disposed at an angle of "c" and "d". The angles "c" and "d" need only be 5° to 10° higher than angles "a" and "b", respectively, to ensure no free play between the ring and the tire in the case where the inlay ring 252b is clipped into the groove 254b after vulcanization. In the case where the ring and the tires are co-vulcanized, this does not apply, as previously discussed. Moreover, the width $J_2$ of the base portion 266b is substantially equal to the width $W_3$ of the slot 254b. However, it is within the terms of the present invention to select the distance $J_2$ to be slightly less by 0.1 mm to 0.5 mm than the width $W_3$ of the slot 254b to provide aesthetic appearance. Also, the width J1 of the flange portion 268b is 60% to 100% of the width $J_2$ of the base portion 266b. If the ratio were larger, then adequate fitting of the ring could not be ensured, and the esthetic aspect might not be acceptable due to the possible visible void between tire and ring. Also, the height $H_1$ of the flange portion can take any value dictated by design considerations. Inlay ring 252a, 252b can be of any color or combination of colors desired. Also, the ring may have the flange portion 268a, 268b of any desired shape and provided with designs, markings, textures, lettering or the like.

While the inlay ring, 252a, 252b has been described as being mounted into the sidewall prior to closing the mold during the vulcanization of the tire 250, it is within the scope of the invention to insert the ring after the completion of the vulcanization of the tire. In that event the base portion 266a, 266b can be adhered within the groove 254a, 254b, respectively, by either the tight fit between the base portion and the groove, or with an adhesive placed within the groove to insure that sufficient adhesive forces can be developed that the inlay ring stays in place. In this embodiment, the inlay ring 252a, 252b can be installed and/or removed from the vulcanized tire at a later time so as to insert another ring for reasons such as styling (using a different color ring) or if the ring is damaged.

An important advantage of the rim flange protector 256a, 256b is its ability to give lasting protection against scuffing, as opposed to the limited protection provided by the prior art elastomeric flanges. Another advantage of the present invention is that the non-rubber flange protector of the present invention, being of reduced volume and better gauge distribution than the prior art rubber flange protectors can be made free of stresses during deflection. Also, the non-rubber material is not a barrier against heat dissipation in the tire as compared to the heavy rubber rim flange protectors, which provided a failure location during high speed operation because of the heat buildup in the rim flange protector. So, contrary to the elastomeric material used in tires, which cannot be repaired after being torn, it is possible to replace or reshape a thermoplastic ring that might have been damaged by curb scuffing.

The shape of the tire which incorporates the inlay ring 252 is not limiting to the present invention. Referring to FIG. 4, there is shown a cross section of a conventionally shaped tire 400 having grooves 254a, 254b incorporating the inlay rings 252a, 252b in a manner as previously discussed.

From a manufacturing standpoint, the ring can have many more shapes than a traditional rubber flange protector, without having the undesirable excessive rubber flow which always has to be minimized during the vulcanization process.

The invention has been illustrated and described in a manner that should be considered as exemplary rather than restrictive in character. It is understood that only preferred embodiments have been shown and described, and that all changes and modifications that come within the scope of the invention are desired to be protected. Undoubtedly, many other "variations" on the techniques set forth hereinabove will occur to one having, ordinary skill in the art to which the present invention most nearly pertains, and such variations are intended to be within the scope of the invention, as disclosed herein.

What is claimed:

1. A pneumatic tire comprising a toroidal shaped carcass having a tread with tread shoulders, bead areas and sidewalls extending radially outward from the bead areas to the tread shoulders, the tire characterized by:

at least one of the sidewalls having a circumferentially extending continuous groove extending into the carcass of the tire, in the bead area, from a surface thereof, said groove extending into the surface of the tire from an opening of the groove to a bottom of the groove, said groove having a trapezoidal cross-sectional shape with a greater radial width at the bottom of the groove than at the opening of the groove:

a non-rubber inlay ring secured within the groove and forming a rim flange protector, said inlay ring having a flange portion, and having a base portion of trapezoidal shape to mate with the groove;

wherein:

the groove has two sidewalls extending from the bottom of the groove to the opening of the groove;

the sidewalls of the groove are disposed at an angle with respect to a center line extending perpendicular to the bottom of the groove;

the base portion of the inlay ring has two sidewalls which are disposed at an angle which is 5 to 10 degrees greater than the angles of the sidewalls of the groove;

the base portion of the inlay ring has an axial width; and the flange portion of the inlay ring has an axial width which is 60% to 100% of the axial width of the base portion of the inlay ring.

2. The pneumatic tire of claim 1 wherein the non-rubber inlay ring is constructed of a material selected from the group consisting of plastic, metal, alloys, thermoplastic and thermoplastic elastomers.

3. The pneumatic tire of claim 2 wherein the non-rubber inlay ring comprises a thermoplastic constructed of ultra-high molecular weight polyethylene.

4. The pneumatic tire of claim 3 wherein the ultra-high molecular weight polyethylene is a coating on the inlay ring made of thermoplastic or thermoplastic elastomer.

5. The pneumatic tire of claim 2 wherein the non-rubber inlay ring comprises an ultra-high molecular weight polyethylene dispersed in a non-ultra-high molecular weight polyethylene matrix to ensure sufficient cohesive forces with the at least one of the sidewalls of the tire.

6. The pneumatic tire of claim 1 wherein the non-rubber inlay ring is secured within the continuous groove of the sidewalls to form a rim flange protector during vulcanization of the tire.

7. The pneumatic tire of claim 1 wherein the non-rubber inlay ring is secured within the continuous groove of the sidewalls to form a rim flange protector subsequent to vulcanization of the tire.

8. The pneumatic tire of claim 7 wherein the non-rubber inlay ring is secured within the continuous groove of the sidewalls with an adhesive.

9. The pneumatic tire of claim 1 wherein:

both bead areas of the tire are provided with a circumferentially extending continuous groove; and a non-rubber inlay ring is provided for each groove.

10. The pneumatic ring of claim 1, wherein:

the sidewalls of the groove are disposed at the same angle as one another.

11. The pneumatic tire of claim 1, wherein:

the sidewalls of the groove are disposed at different angles than one another.

12. The pneumatic tire of claim 1, wherein the axial width of the base portion of the inlay ring is substantially equal to an axial width of the groove.

13. The pneumatic tire of claim 1, wherein the axial width of the base portion of the inlay ring is slightly less than an axial width of the groove.

14. The pneumatic tire of claim 1, wherein the flange portion of the inlay ring is provided with designs, markings, textures or lettering.

* * * * *